United States Patent [19]
Yajima

[11] Patent Number: 4,810,108
[45] Date of Patent: Mar. 7, 1989

[54] BEARING

[75] Inventor: Hirotaka Yajima, Komoro, Japan

[73] Assignee: Minebea Kabushiki-Kaisha, Nagano, Japan

[21] Appl. No.: 71,790

[22] Filed: Jul. 10, 1987

[30] Foreign Application Priority Data

Jul. 11, 1986 [JP] Japan .......................... 61-106585[U]

[51] Int. Cl.⁴ .............................................. F16C 43/04
[52] U.S. Cl. ..................................... 384/488; 384/537; 384/585
[58] Field of Search ............... 384/488, 512, 537, 585, 384/135; 277/1

[56] References Cited

U.S. PATENT DOCUMENTS

| | | | |
|---|---|---|---|
| 1,210,921 | 1/1917 | Focardi | 384/512 |
| 2,510,659 | 6/1950 | Ristow | 384/512 |
| 3,428,379 | 2/1969 | Readman | 384/537 |
| 3,451,736 | 6/1969 | Riccio | 384/537 |
| 4,676,671 | 6/1987 | Gössmann | 384/488 |

Primary Examiner—Lenard A. Footland
Attorney, Agent, or Firm—Fred Philpitt

[57] ABSTRACT

Described is a bearing including an annular inner raceway formed directly on the outer periphery of a rotary shaft, a plurality of bearing balls held between the inner raceway and an outer raceway formed on the outer periphery of an outer ring, a retainer for retaining the balls in position and a tubular housing securely fitted to the outer ring. The bearing may be designed as the double row type by providing a pair of outer rings each having an inner raceway and a pair of outer raceways formed on the rotary shaft. The inner ring may be dispensed with so that the bearing may be simplified in design and improved in load withstand properties.

2 Claims, 1 Drawing Sheet

BEARING

BACKGROUND OF THE INVENTION

1. Field of the Invention

This invention relates to a bearing especially suitable for use with rotating parts of relatively small-sized devices, such as office automation (OA) devices.

2. Description of the Prior Art

In conventional radial bearings, bearing balls are arranged between the inner and outer rings, and a rotary shaft is supported by the inner ring. Thus it becomes necessary to provide the inner ring in addition to the outer ring, and to provide raceways on both the outer and inner rings.

In some bearings, sealing plates are used for closing the lateral sides of the bearings to prevent leakage of lubricants, such as the grease. However, these sealing plates are secured at the outer peripheral edges to the end faces of the outer rings while the inner peripheral edges thereof are simply contacted with the end faces of the inner rings. As a result thereof, leakage of the grease stored between the inner rings and the rotary shaft occurs along the rotary shaft, so that components attached to the rotary shaft, such as hubs used for securing floppy disks or other disks, may be contaminated with grease.

SUMMARY OF THE INVENTION

It is an object of the present invention to provide a bearing wherein a raceway or raceways are formed directly on the rotary shaft to dispense with the inner ring.

It is another object of the present invention to provide a bearing wherein sealing plates are secured to the rotary shaft to prevent grease leakage along the rotary shaft.

It is a further object of the present invention to provide a bearing wherein a housing is fitted to the outer rings and secured thereto with a larger adhesion strength.

It is a further object of the present invention to provide a bearing wherein radial bearing balls are arranged in double rows running parallel to each other for improving load withstand properties of the bearing. It is a still further object of the present invention to provide a bearing with a smaller number of component parts and hence to reduce production costs.

Figure 1:
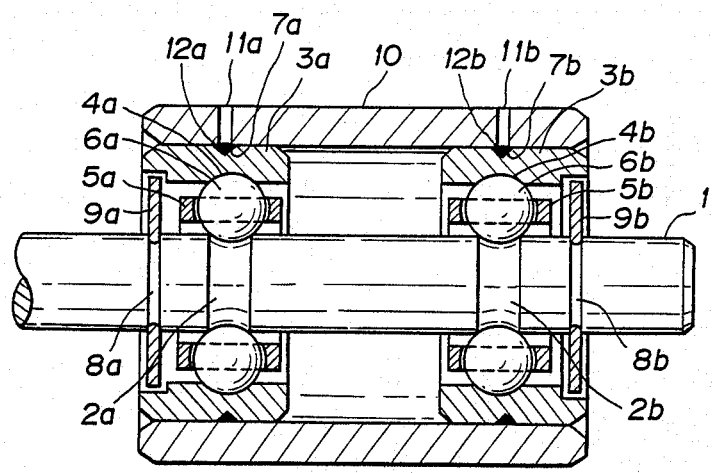
FIG. 1 is a longitudinal sectional view showing a bearing according to a preferred embodiment of the present invention.
Figure 2:
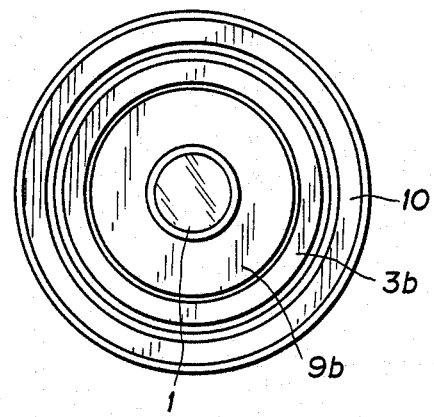
FIG. 2 is an end view seeing from the right side of FIG. 1.

DESCRIPTION OF THE PREFERRED EMBODIMENT:

In the drawing, the numeral 1 denotes a rotary shaft on which a pair of annular grooves 2a, 2b are formed as the inner raceways parallel to each other and transversely of the axis of the shaft 1. These grooves are formed to the left and right sides when viewed in FIG. 1.

The numerals 3a, 3b denote outer rings having peripheral grooves 7a, 7b, respectively, on the outer periphery and annular grooves 4a, 4b as the outer raceways, respectively. A plurality of bearing balls 6a, 6b held by retainers 5a, 5b are provided between the grooves 2a, 2b as the inner raceways and the grooves 4a, 4b as the outer raceways.

These annular grooves 2a, 2b on the rotary shaft 1 as the inner raceways and the annular grooves 4a, 4b on the outer rings 3a, 3b as the outer raceways are arcuate in cross-section with the radius of curvature of these grooves being slightly larger than the radius of the balls 6a or 6b.

The retainers may be of any desired type, such as the ribbon or crown type. The crown type retainer is most preferred.

The rotary shaft 1 is also formed with a pair of peripheral grooves 8a, 8b on the outer sides of the annular grooves 2a, 2b, respectively. An annular sealing plate 9a has a press fit at the inner periphery thereof into the annular groove 8a. Similarly, an annular sealing plate 9b has a press fit at the inner periphery thereof into the annular groove 8b. The outer peripheries of the sealing plates 9a, 9b are extended to the vicinity of the end faces of the sealing plates 9a, 9b.

The sealing plates may be formed of any desired material exhibiting suitable strength and resiliency. Resilient annular plates comprised of metallic annular plates with suitable synthetic rubberb secured and molded thereto are most preferred as the sealing plates.

The outer rings 3a, 3b are secured by a press fit in the inside of a tubular housing 10.

The housing 10 has injection ports 11a, 11b opened into the peripheral grooves 7a, 7b on the outer rings 3a, 3b. An adhesive indicated at 12a, 12b is injected through these ports 11a, 11b so as to be filled into the peripheral grooves 7a, 7b on the outer rings 3a, 3b for securely connecting the housing and the outer rings to one another.

In the above described embodiment, the inner raceways are formed as a pair of annular grooves on the periphery of the rotary shaft and the bearing balls are disposed between the grooves or the inner raceways and another pair of annular grooves formed as the outer raceways on the inner peripheries of the outer rings. The first pair of the annular grooves formed as the inner raceways on the rotary shaft play the role of the inner raceways of the conventional bearing s that the inner ring used in the conventional bearing is dispensed with.

The sealing plates are secured at the inner peripheries thereof to the rotary shaft so that lubricant leakage along the length of the rotary shaft may be minimized.

The outer peripheries of the outer rings are formed with the aforementioned peripheral grooves into which the adhesive is filled through the ports in the housing for securing the outer rings and the housing to each other. This system of connection results in the connecting strength between the outer rings and the housing significantly higher than that achieved with the simple press-fit connection system.

Since the housing is provided about the outer rings, a pair of these rings may be provided towards both axial ends of the housing so that the balls may be provided in double parallel rows resulting in improved load withstand properties.

What is claimed is:

1. A shaft and bearing arrangement comprising in combination
   (a) a tubular housing (10),
   (b) at least one outer ring (3a, 3b) positioned annularly within said tubular housing (10), the outer surface of each outer ring (3a, 3b) bearing against the inner surface of said tubular housing (10),
- (c) a rotary shaft (1) disposed centrally within said at least one ring (3a, 3b) at a spaced distance therefrom,
- (d) an annular inner raceway (2a, 2b) formed on the outer surface of said rotary shaft (1),
- (e) an annular outer raceway formed on the inner surface of said at least one outer ring (3a, 3b),
- (f) a plurality of bearing balls (6a, 6b) seated between said inner and outer raceways,
- (g) retainer means for holding said bearing balls at spaced apart intervals in said raceways,
- (h) an injection port (11a, 11b) passing through said housing so as to provide access to each outer ring (3a, 3b) and a groove on the outer periphery of each outer ring (3a, 3b), each injection port and groove being filled with an adhesive (12a, 12b) so as to hold said housing (1) and each said ring (3a, 3b) in a fixed position relative to each other, and
- (i) spaced apart annular grooves (8a, 8b) on said shaft and sealing plates (9a, 9b) seated in said annular grooves (8a, 8b), said plates (9a, 9b) being located at opposite ends of the bearing arrangement.

2. A shaft and bearing arrangement comprising in combination
- (a) an elongated tubular housing (10),
- (b) two outer rings (3a, 3b) positioned annularly within said tubular housing (10) at spaced apart points, the outer surface of each outer ring (3a, 3b) bearing against the inner surface of said tubular housing (10),
- (c) a rotary shaft (1) disposed centrally within said outer rings (3a, 3b) at a spaced distance therefrom,
- (d) an annular inner raceway (2a, 2b) formed on the outer surface of said rotary shaft (1),
- (e) an annular outer raceway formed on the inner surface of each of said outer rings (3a, 3b),
- (f) a plurality of bearing balls (6a, 6b) seated between said inner and outer raceways,
- (g) retainer means for holding said bearing balls at spaced apart intervals in said raceways,
- (h) an injection port (11a, 11b) passing through said housing so as to provide access to each outer ring (3a, 3b) and a groove on the outer periphery of each outer ring (3a, 3b), each injection port and a groove being filled with an adhesive (12a, 12b) so as to hold said housing (1) and each said ring (3a, 3b) in a fixed position relative to each other, and
- (i) spaced apart annular grooves (8a, 8b) on said shaft (1) and sealing plates (9a, 9b) seated in said annular grooves (8a, 8b), said plates (9a, 9b) being located at opposite ends of the bearing arrangement.

* * * * *